Feb. 11, 1936.　　　　L. C. HUCK　　　　2,030,169
RIVET
Original Filed April 12, 1932
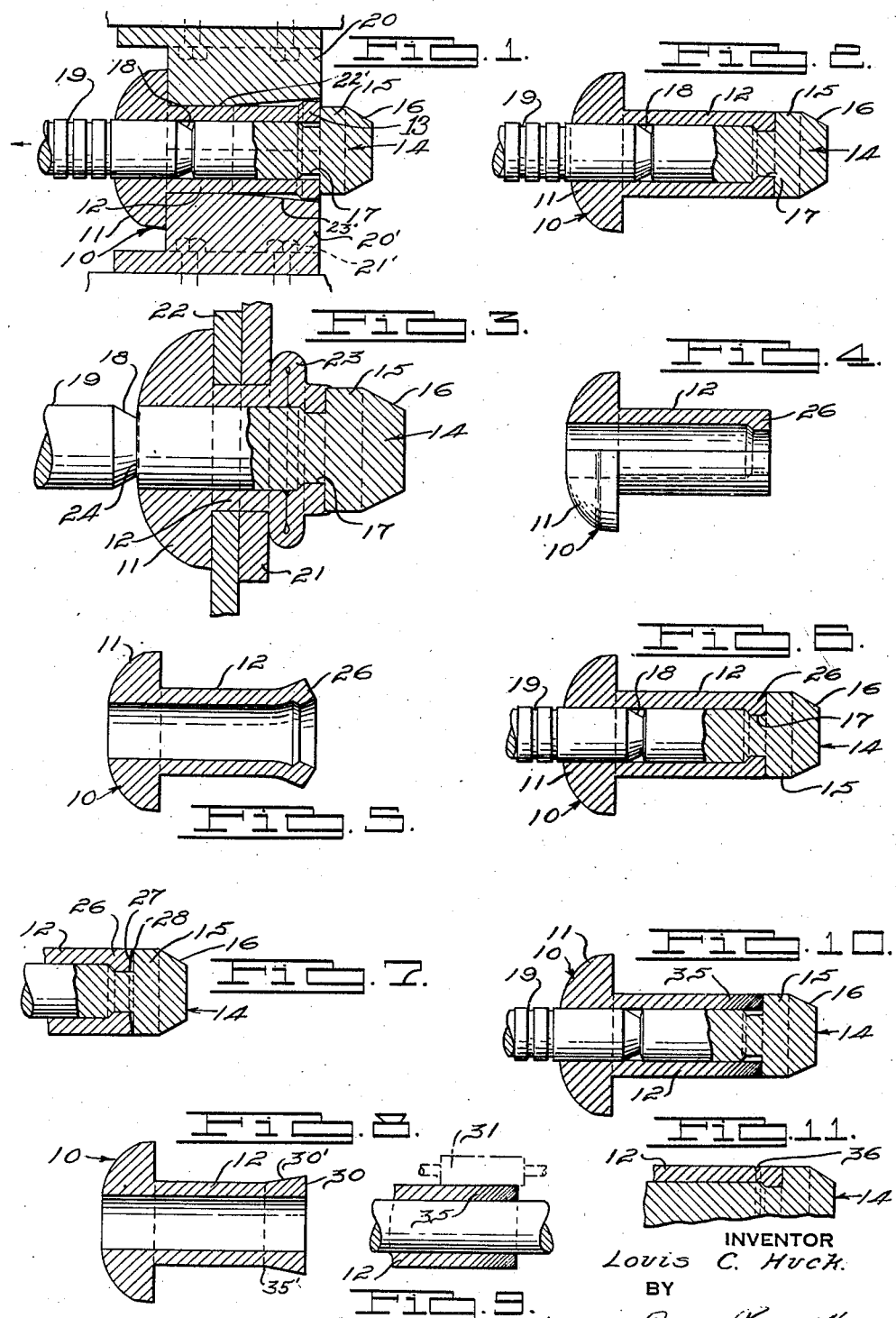
INVENTOR
Louis C. Huck.
BY
Harness Dickey Pierce & Hamm
ATTORNEYS.

Patented Feb. 11, 1936

2,030,169

UNITED STATES PATENT OFFICE 2,030,169

RIVET

Louis C. Huck, Grosse Pointe, Mich., assignor to Huxon Holding Corporation, Detroit, Mich., a corporation of Michigan Application April 12, 1932, Serial No. 604,759
Renewed January 12, 1935

22 Claims. (Cl. 85—40)

The invention relates to rivets and it has particular relation to a rivet which may be inserted from one side of a structure and set from the same side, and a method of manufacturing the rivet.

In general the invention relates to a rivet comprising a tubular female member and a male or shank member extending through the female member and having a head at one end for engagement with one end of said tubular member. That end of the male or shank member opposite the head, projects beyond the opposite end of the tubular member and serves as a gripping means during the rivet setting operation, when such end of the male member is pulled and the reactionary force is applied against the adjacent end of the female member. This assembly is inserted through openings in a structure to be riveted and during the rivet setting operation, the head on the male or shank member applies an axially compressive force to the adjacent end of the female member, which is opposed to the above mentioned reactionary force applied to the opposite end of the female member, and as a result the tubular member between the structure being riveted and the end thereof abutting the head of the male member, may be bulbed outwardly to form a head against the structure. A similar head might be formed at the opposite side of the structure, but preferably a head will initially be formed at this end of the member and the reactionary force to the pull on the shank will be applied through such head and ordinarily against the structure being riveted. In rivet setting in this manner it is quite important that the end of the female member abutting the head on the male member be reinforced against bursting so as to prevent the head on the latter from moving into or through the female member.

One of the objects of the invention is to provide a rivet construction having an improved and highly efficient means for reinforcing an end of the female or tubular member against bursting during the rivet setting operation, which will facilitate manufacture of the rivet as well as insure bulbing of the female member uniformly and properly into the desired head against that side of the structure to which it is adjacent.

Another object of the invention is to provide a rivet construction of substantially uniform body wall thickness in which the reinforcement is obtained prior to any phase of the rivet setting operation.

Another object of the invention is to provide a rivet of the general type described, in which the female and male members are positively locked together during assembling thereof, so as to provide a lock which will prevent relative axial movement thereof after the rivet setting operation.

Another object of the invention is to provide a highly efficient and positively acting means for substantially preventing twisting of the end portion of the female member adjacent the head on the male member, about any circumferentially extending axis during formation of the bulb against the side of the structure being riveted.

Another object of the invention is to provide a method of manufacturing a rivet comprising a female, tubular member, and a shank or male member extending therethrough, in which the end of the female member to be reinforced against bursting, is so manipulated or treated during assembly of the male and female members that such reinforcement is effected efficiently and inexpensively.

Another object of the invention is to provide a method of manufacturing a female rivet member, in which the end of the latter is reinforced against bursting by so treating the material of which it is composed that its inherent strength is increased with respect to the material forming the remainder of the member.

Other objects of the invention will be apparent from the following description taken in conjunction with the drawing and from the claims hereinafter set forth.

For a better understanding of the invention, reference may be had to the accompanying drawing forming a part of the specification, wherein:

Figure 1 is a longitudinal cross-sectional view of a rivet assembly constructed according to one form of the invention, illustrating the manner in which the female and male members are constructed prior to and after the initial assembling operation;

Figure 2 is a similar view, illustrating how an enlarged end portion of the female member is radially contracted into a groove in the end of the male member;

Figure 3 illustrates on a larger scale, the rivet shown by Figure 2, as utilized for riveting a structure;

Figure 4 is a fragmentary cross-sectional view, illustrating a female member constructed according to another form of the invention, prior to assembling it with the male member;

Figure 5 illustrates the female member shown by Figure 4, after an end thereof has been flared out slightly either prior to or during assembly thereof with the male member;

Figure 6 is a cross-sectional view illustrating a male member such as that shown by Figure 1, assembled with the female member shown by Figure 5, after the flared out end shown by Figure 5 is radially contracted into the groove in the male member;

Figure 7 is a fragmentary cross-sectional view of a rivet which may be constructed similarly to the construction illustrated by Fig. 6, but which is of slightly different construction.

Figure 8 is a longitudinal cross-sectional view of a female member which may initially be constructed similarly to the construction of female member illustrated by Figure 1;

Figure 9 illustrates the manner in which the slightly enlarged end of the female member is reduced in outer diameter without substantially changing its inner diameter, so as to strain harden the end portion of the female member for reinforcement purposes;

Figure 10 illustrates the female member constructed according to Figures 8 and 9, as assembled with a male member similar to that shown by Figure 1, and Figure 11 illustrates another form of the invention in which the female member has a groove in its outer surface adjacent the male member head.

Referring to Figure 1, the assembled rivet comprises a female member 10 of tubular character, having a tubular head 11 at one end, and a body portion 12 defined by a continuous, annular wall of substantially uniform radial thickness throughout its length. At that end of the body portion opposite the head 11, an annular shoulder or collar 13 is provided which initially has an inner diameter substantially corresponding to the inner diameter of the body portion 12 but which has an outer diameter somewhat greater so that the radial thickness of the collar is greater than the radial thickness of the wall of the body portion. Also as shown, a male or shank member 14 extends through the female member, and has a head 15 at one end for engaging the end face of the collar or shoulder 13. The maximum outer diameter of the head 15 preferably corresponds substantially to the outer diameter of the body portion 12, and an end portion of the head as indicated at 16 may be beveled to facilitate inserting the assembly into structural openings.

The male member adjacent the head 15 and radially inward of the collar 13 is provided with an annular groove 17, and longitudinally spaced from this groove, it has an undercut or neck 18 which is located intermediate the ends of the female member when the parts are initially assembled. The male member also projects beyond the head 11 of the female member and its projecting end portion is provided with threads or grooves 19, for facilitating gripping thereof by jaws in a rivet setting machine which may, for example, be similar to that disclosed in the application for patent of Louis C. Huck and Ralph A. Miller, Serial No. 560,289, filed August 31, 1931. Preferably, that part of the male member between the groove 17 and the undercut or neck 18 will initially have at least a slight press fit in the body 12 of the female member and that part of the male member between the threads or grooves 19 and such undercut 18 preferably will be of slightly smaller outer diameter to facilitate assembling the members. When the parts are thus assembled as shown in Figure 1, suitable means such as a shrinking or swedging die, may be employed for radially compressing or contracting the collar or shoulder 13 into the annular groove 17 in the male member.

As shown in Figure 1, a shrinking die is employed which may comprise segments 20 and 20' adapted to be bolted to platens as indicated at 21'. One platen may be movable with respect to the other so that the segments may be set about the female rivet member. Such segments have semi-cylindrical portions 22' for substantially fitting the body portion 12 although not binding thereon, and conical or tapered portions 23' to the right thereof. When the rivet assembly is moved to the left through the die, as by pulling the male member at the left end or pushing the right end thereof, the conical portions gradually force the collar on the female member into the groove 17 in the male member, and finally the semi-cylindrical parts of the die render the collar portion substantially cylindrical and of approximately the same outer diameter as that of the body 12. Preferably the excess of metal in the collar will fill the groove 17, but if there should be more than this amount of metal, the die would shear or extrude it past the end of the female member. The assembly as thus manufactured is illustrated in Figure 2. It should be appreciated that such collar or shoulder as a result of its greater radial thickness, will have greater resistance to bursting and hence will more strongly resist any movement of the head 15 of the male member through the female member when the threaded end 19 of such male member is pulled while applying the reactionary force against the head 11 of the female member. While the collar 13 as shown in Figure 1, would accomplish this purpose, its outer diameter is such that it would be impossible to insert the assembly through openings in a structure to be riveted by inserting the head 15 of the male member first, particularly if there were only slight clearance between the outer diameter of the body 12 of the female member and the openings in the structure and normally this would be the case. Accordingly by swedging or radially contracting the collar 13 into the groove 17 in the male member, the outer diameter of such collar may be reduced until it substantially corresponds to the outer diameter of the body portion 12, as clearly shown by Figure 2, thereby permitting insertion of the assembly through openings in a structure to be riveted under the conditions described, while still obtaining the increased resistance to bursting at the end of the female member defined by the collar. Again it is evident that by radially contracting or swedging the collar 13 into the groove 17 in the male member the members are positively locked together against relative axial displacement, although it should be understood that this locking engagement will not prevent setting of the rivet but will be intended primarily to lock the parts together against displacement after the rivet is set.

In setting the rivet, the assembly is inserted through openings in structural elements such as the plates 21 and 22 shown in Figure 3, by making the insertion from the left side of the structure, and then by pulling the threaded end 19 of the male member and applying the reactionary force to the head 11 of the female member, the head 15 on the male member acting through the collar or shoulder 13 will cause bulbing of the body portion 12 between the structural element 21 and the collar, to form the bulbed head indicated at 23. During this operation, the shoulder or collar 13 may be axially compressed to some extent, but its end face will be maintained in contact with the end face of the head 15, and it will not twist about any circumferential axis, at least to any appreciable extent, during formation of the bulbed head. It might be added that the dimensions of the male and female members, and particularly the dimensions of the body 12, are such that initially and prior to forming of the bulb 23, the body 12 will be upset or axially compressed sufficiently to fill any space between body and the sides of the openings in the plates, as well as any space between the members in such openings. After the head 23 is formed, tension on the male member will cause it to break at the base of the undercut or groove 18, and normally this undercut will be so located that the break will occur substantially at the outer end of the head 11 on the female member so that the broken end of the male member still in the female member will constitute substantially a continuation and flush part of the head 11. This line of rupture is indicated at 24 in Figure 3.

The dimensions of and materials in the male and female members, and particularly the dimensions of the body 12 of such female member, may correspond to dimensions and materials set forth with respect to the male and female members in my co-pending application for patent, Serial No. 599,868, filed March 19, 1932. This type of construction insures upsetting of the body 12 in the structural openings to fill the latter and thereby obtain a tight rivet, and formation of the bulb 23 in the preferred or globular member as particularly described in such co-pending application for patent.

In the construction shown by Figure 4, the female member is substantially identical to that disclosed in Figure 1 with the exception that initially it is provided with a collar or annular shoulder 26 which has an outer diameter substantially corresponding to the outer diameter of the body 12, but whose inner diameter is reduced to provide the greater radial thickness of the collar. After this construction is formed, the collar portion and adjacent end of the body 12 are outwardly flared as shown in Figure 5, so that the flared portion will have its smallest inner diameter not smaller than the largest outer diameter of the male member body to be inserted. This flaring out may be accomplished by a suitable tool or pin having a conical, enlarged portion to be inserted through the female member. As shown, the construction permits inserting a male member such as that shown by Figure 1 thereinto, until the head 12 on the male member substantially engages the end of the collar 26. Then by means of a suitable shrinking die or swedging die as shown in Figure 1, the collar or shoulder 26 may be contracted radially into the groove 17 in such male member. The resulting assembly is quite similar in appearance to that shown by Figure 1 but it will be appreciated that the collar 26 has been contracted in the groove in the male member by a different treatment of the metal therein.

In the construction shown by Figure 7, an arrangement similar to that shown by Figure 6 is provided, with the exception that the end face of the collar 26 preferably is concaved or angled slightly as indicated at 27 with respect to the axis of the member so that as finally assembled the end face of the head 15 of the male member substantially contacts with the end face of the collar only along its outer margin as indicated at 28. This facilitates obtaining greater stressing of the outer fibers of the body 12 with respect to stressing of the inner fibers thereof during the rivet setting operation, and such difference of fiber stress is instrumental in locating the portion of body 12 of greatest diameter during initial bulbing nearer to the structure being riveted than to the collar. It should be evident that the end face of the collar might be radial as shown in Figure 6, and that the end face of the head 15 on the male member might have an angularity to attain the outer marginal contact 28. Increased outer fiber stressing might also be obtained in the construction shown by Figure 2, preferably by undercutting the end face of the head 15 on the male member as last suggested. In setting the rivet, with the face on head 15 undercut, the end face of the collar would tend to align itself with the surface on the head of the male member and during subsequent setting of the rivet, the angularity of the contacting faces on the collar and male member head would tend also to direct the force application longitudinally of the female member and at a slight angle toward its axis. This direction of force application also may be instrumental in locating the portion of body 12 of greatest diameter during initial bulbing, nearer to the structure than to the collar.

In the construction shown by Figures 8, 9 and 10, the body 12 of the female member initially may be similar to that shown in Figure 1, in that a collar 30 is provided, but such collar preferably is tapered as indicated at 30'. Then as shown by Figure 9, a mandrel is inserted in the female member, and by means of suitable devices such as rollers 31, the collar 30 is compressed radially until its outer surface substantially corresponds in diameter to the outer diameter of the body portion 12. During this operation, the metal in the collar is cold worked and strain-hardened and in this manner the inherent strength of resistance to bursting of the end of the female member is increased. It will be noted that this strain hardening increases from the beginning 35 of the taper 30' to the right end of the female member, as shown by cross hatching in Figure 10. Normally, the beginning of the strain hardened portion may define the adjacent end of the bulbing portion of body 12, and accordingly by varying the length of the collar, and hence the strain hardened portion, the end of the bulbing portion adjacent thereto may be varied in location. This type of female member might be constructed by strain hardening a solid element having the tapered shoulder or collar, and then drilling therethrough to make the member tubular. Instead of so treating the material in the collar in this manner, the female member might instead of having a collar of increased radial thickness, have an end portion corresponding in inner and outer diameter to the body portion 12 and then such end might be heat treated to increase its bursting strength. The length of the heat treated portion may be employed to vary the location of the right end of the bulbing body portion similarly to the manner described in conjunction with the strain hardening shown by Figure 10. When a female member of either type is assembled with a male member as shown by Figure 10, and the rivet is set, the female member may be compressed axially to cause a flow of metal into the groove 17, sufficient to lock the members against relative axial movement after the rivet is set.

In the construction shown by Fig. 11, the female member is similar to that shown by Fig. 2 but has a groove 36 in its outer surface adjacent to the left end of the collar to further facilitate preventing circumferential twisting of the collar during setting of the rivet, and maintaining the end face of the collar parallel to the adjacent face on the head of the male member. This groove might also be employed in the other constructions shown.

It has been stated in conjunction with Figs. 1 to 3 inclusive that the materials in and dimensions of the female and male members might correspond to those materials and dimensions set forth in my co-pending application for patent referred to above. Such relation of materials and dimensions may also apply to the remaining figures. Particularly, the wall thickness of the body portion 12 is so proportioned to the outer diameter thereof that upsetting of the metal thereof in the structural openings should occur to fill them tightly prior to bulbing, and also as stated in my co-pending application for patent, the bulb in its initial stage of bulbing should be globular or have substantially uniform radius of curvature in axial cross section.

In any of the constructions described and illustrated the end of the female member abutting the male member head is strongly reinforced against bursting and the increased bursting strength is effected prior to any phase of the rivet setting operation. It is also apparent that rivet constructions have been provided in which the male and female members are positively locked against axial displacement other than that necessary for setting the rivet by the same means that increases the bursting strength of the end of the female member. It is also apparent that novel methods have been provided for manufacturing rivet constructions to obtain female members with increased bursting strength at the ends thereof, to be engaged by the male member head and that such methods of manufacture involve a minimum number of operations and relatively little expense.

In general the invention provides highly efficient forms of rivets adapted to be set from one side of a structure only so as to facilitate riveting structures, one side of which is more or less inaccessible. Moreover, while permitting this rivet setting operation from one side of a structure, the rivet constructions devised are extremely strong as a result of bulbing a continuously annular body portion of a female member into a bulb against one side of a structure and when so applied tightly connect the structural elements and prevent seeping of water or the like through the connections.

Although more than one form of the invention has been described and illustrated in detail it will be apparent to those skilled in the art that various modifications may be made without departing from the scope of the appended claims.

I claim:

1. An article of manufacture comprising a rivet member adapted to project through openings in a structure to be riveted and having a portion adapted to project beyond one side thereof and to be bulbed into an annular head by applying opposed axial forces to the ends thereof, said portion of the member being substantially cylindrical entirely to its outer end and the wall thereof being continuously annular and of substantially uniform radial thickness, and means inherent in the other end of said portion increasing the resistance of said end to bursting and substantially preventing its expansion when the bulbed head is to be formed.

2. An article of manufacture comprisng a rivet member adapted to project through openings in a structure to be riveted and having a portion adapted to project beyond one side thereof and to be bulbed into an annular head by applying opposed axial forces to the ends thereof, said portion of the member being substantially cylindrical entirely to its outer end and the wall thereof being continuously annular and of substantially uniform radial thickness, and means inherent in the outer end of said portion increasing the resistance of said end to bursting and substantially preventing its expansion when the bulbed head is to be formed, said means comprising an end sector at the outer end of said portion composed of metal inherently more resistant to bursting.

3. An article of manufacture comprising a rivet member adapted to project through openings in a structure to be riveted and having a portion adapted to project beyond one side of the structure and to be bulbed into an annular head by applying opposed axial forces to the ends thereof, said portion being tubular and the wall thereof being continuously annular and of substantially uniform radial thickness, and means inherent in the free end of the projecting portion for increasing its bursting strength and substantially preventing expansion of said end when said portion is to be bulbed, said means comprising an annular end section of substantially the same outer diameter as that of the portion to be bulbed but of smaller inner diameter.

4. An article of manufacture comprising a rivet member adapted to project through openings in a structure to be riveted and having a portion adapted to project beyond one side of the structure and to be bulbed into an annular head by applying axially opposed forces to the ends thereof, said portion being tubular and the wall thereof being continuously annular and of substantially uniform radial thickness, and means inherent in the free end of the projecting portion for increasing its bursting strength and substantially preventing expansion of said end when said portion is to be bulbed, said means comprising an annular end portion composed of material inherently more resistance to bursting.

5. An article of manufacture comprising a tubular rivet member having a head at one end for engaging one side of a structure to be riveted, and a body portion of tubular character adapted to extend through openings in the structure to be riveted and having a continuously annular portion adapted to project beyond the outer side of the structure and to be bulbed into an annular, folded head by axially compressive forces directed against opposed ends thereof, said body portion from said head to the other end of the member being substantially of uniform radial thickness, and means at the end of the member opposite the head inherently increasing its bursting strength and adapted to prevent expansion of said end when said projecting portion is to be bulbed, said means comprising an annular end portion of the member having a smaller inside diameter than that of the body.

6. An article of manufacture comprising a tubular member having a head at one end for engaging one side of a structure to be riveted, and a body portion of continuously annular character adapted to project through openings in the structure and beyond the opposite side thereof and to be bulbed into a head at the latter side, said body portion from said head to the other end of the member being of substantially uniform radial thickness, and means at the latter end of the member inherently increasing its bursting strength and adapted to prevent expansion of said end when the head is to be formed, said means comprising an annular end portion composed of material inherently more resistant to bursting.

7. A rivet as an article of manufacture, comprising a tubular member having a portion adapted to be bulbed into an annular head by axial forces directed against the ends thereof, said portion having an end sector strain hardened to substantially prevent its expansion when the portion is to be bulbed.

8. A rivet as an article of manufacture comprising a tubular member having a portion adapted to be bulbed into an annular head by axial forces directed against the ends thereof, said portion having an end sector strain hardened progressively in an axial direction to increase its resistance to expansion when said portion is bulbed.

9. A rivet as an article of manufacture comprising a tubular member having a portion adapted to be bulbed into an annular head by axial forces directed against the ends thereof, said portion having an end sector wherein the metal is inherently treated to increase its resistance to expansion when said portion is to be bulbed.

10. A rivet as an article of manufacture comprising a tubular member having a portion adapted to be bulbed into a head by axial forces directed against the ends thereof, said portion having an end sector wherein a unit of the metal is inherently more resistant to expansion than a unit of the metal intermediate the ends of portion so as to restrain expansion of said more resistant unit during the bulbing operation.

11. An article of manufacture comprising a rivet member of tubular character adapted to project through openings in a structure to be riveted and having a continuously annular portion adapted to project beyond one side of the structure and to be bulbed into an annular head by axially directed forces applied to opposed ends thereof, a pin extending through the tubular member, means on one end of the pin for axially moving the free end of said projecting portion of the tubular member when the pin is pulled from the opposite end of the member and the latter end of the member is held against axial movement, said tubular portion adapted to be bulbed being substantially of uniform radial thickness, and means in the free end of said portion increasing its resistance to bursting when the bulbed head is to be formed.

12. An article of manufacture comprising a tubular rivet member adapted to project through openings in a structure to be riveted and having a continuously annular portion adapted to project beyond one side of the structure and to be bulbed into an annular head by applying axially directed forces to the ends thereof, the wall of said projecting portion of the member being of substantially the same radial thickness, a pin projecting through the tubular member, means on one end of the pin for applying axial forces to the free end of the projecting portion of the tubular member when the pin is pulled from the opposite end of the member and the reactionary force is applied to said end of the member, and means inherent in the free end of the projecting portion increasing its bursting strength when said portion is bulbed, said means comprising an annular, cross-sectionally integral end portion of increased radial thickness.

13. An article of manufacture comprising a tubular rivet member adapted to project through openings in a structure to be riveted and having a continuously annular portion adapted to project beyond one side of the structure and to be bulbed into an annular head by applying axial forces to opposite ends of the member, the wall of said projecting portion being substantially of uniform radial thickness, means inherent in the free end of the projecting portion for increasing its bursting strength when said portion is bulbed and comprising an annular end portion composed of material inherently more resistant to bursting, a pin extending through the tubular member, and means on one end of the pin for engaging said free end of the projecting portion of the tubular member for applying axial force thereto when the pin is pulled from the opposite end of the member and the reactionary force is applied to the same end of the member.

14. A rivet as an article of manufacture comprising a tubular member adapted to project through openings in a structure to be riveted and having a continuously annular portion adapted to project from one side of the structure and to be bulbed into an annular head upon applying axial forces to opposite ends thereof, said tubular member having an end sector at the free end of its projecting portion which is strain hardened to increase its resistance to expansion when the bulbed head is formed, a pin extending through the tubular member, and means on the pin for engaging said free end of the projecting portion of the tubular member for applying axial forces thereto when the pin is pulled from the opposite end of the member.

15. A rivet as an article of manufacture comprising a tubular member adapted to project through openings in a structure and to project beyond one side thereof to provide a portion adapted to be bulbed into a head when axially directed forces are applied to opposite ends of the member, the free end of said projecting portion having an end sector strain hardened progressively in an axial direction to increase its resistance to and substantially prevent expansion thereof when the portion is bulbed, and a pin extending through the tubular member.

16. A rivet as an article of manufacture comprising a tubular member having a portion adapted to be bulbed into an annular head upon applying axial forces to opposite ends of the member, the free end of said projecting portion having a sector wherein the metal is inherently treated to increase its resistance to and substantially prevent expansion when the portion is to be bulbed, and a pin extending through the tubular member.

17. A rivet as an article of manufacture comprising a tubular member having a portion adapted to be bulbed into an annular head by applying axial forces to opposed ends of the member, said portion to be bulbed having a unit of metal at its free end which is inherently more resistant to and which substantially prevents expansion when the portion is to be bulbed, than a unit of the metal intermediate the ends of the portion, and a pin extending through the tubular member.

18. A metal rivet comprising a tubular body having a head at one end, and a shank in the body projecting beyond the head, said shank having a head engaging the opposite end of the body, the body adjacent the head on the shank being composed of denser metal than an intermediate portion of the body.

19. A metal rivet comprising a member adapted to project through structural openings and having a tubular portion adapted to project beyond one side of the structure and to be outwardly bulbed intermediate its ends into a head, and means in the outer end of such tubular portion for increasing its resistance to and preventing its expansion upon bulbing such portion, said means comprising an end sector wherein the metal is inherently more resistant to expansion.

20. A metal rivet comprising a member adapted to project through structural openings and having a tubular portion adapted to project beyond one side of the structure and to be outwardly bulbed intermediate its ends into a head, and means in the outer end of such tubular portion for increasing its resistance to and preventing its expansion upon bulbing such portion, said means comprising an end sector wherein the metal is strainhardened to inherently increase its resistance to expansion.

21. A metal rivet comprising a tubular member adapted to project through openings in a structure to be riveted and having a continuously annular portion adapted to project from one side of the structure and to be bulbed into an annular head upon applying axial forces to opposite ends thereof, said tubular member having an end sector at the free end of its projecting portion wherein the metal is treated to increase its inherent resistance to expansion upon application of such forces, a pin projecting through such member and having a projecting portion at the opposite end of the tubular member for pulling the pin, and means on the pin for applying axial forces to said sector, the rivet being adapted to be set by pulling said projecting portion of the pin and applying the reactionary force to the adjacent end of the tubular member.

22. A rivet comprising a tubular member, a pin extending through the tubular member and having a recess at its end, the tubular member having a portion projecting into the recess, said portion being characterized by initially being outwardly flared and then conducted into the recess.

LOUIS C. HUCK.